(12) United States Patent
Shan et al.

(10) Patent No.: US 11,574,351 B2
(45) Date of Patent: Feb. 7, 2023

(54) SYSTEM AND METHOD FOR QUALITY ASSESSMENT OF PRODUCT DESCRIPTION

(71) Applicants: Beijing Wodong Tianjun Information Technology Co., Ltd., Beijing (CN); JD.com American Technologies Corporation, Mountain View, CA (US)

(72) Inventors: Huasong Shan, Mountain View, CA (US); Li Chen, Mountain View, CA (US); Hui Zhou, Sunnyvale, CA (US)

(73) Assignees: Beijing Wodong Tianjun Information Technology Co., Ltd., Beijing (CN); JD.com American Technologies Corporation, Mountain View, CA (US)

( * ) Notice: Subject to any disclaimer, the term of this patent is extended or adjusted under 35 U.S.C. 154(b) by 222 days.

(21) Appl. No.: 17/018,606

(22) Filed: Sep. 11, 2020

(65) Prior Publication Data
US 2022/0084095 A1 Mar. 17, 2022

(51) Int. Cl.
*G06Q 30/06* (2012.01)
*G06F 17/18* (2006.01)
(Continued)

(52) U.S. Cl.
CPC ......... *G06Q 30/0627* (2013.01); *G06F 17/18* (2013.01); *G06F 40/289* (2020.01);
(Continued)

(58) Field of Classification Search
None
See application file for complete search history.

(56) References Cited

U.S. PATENT DOCUMENTS

| | | | | |
|---|---|---|---|---|
| 8,117,199 B2 * | 2/2012 | Ghani | ................ | G06Q 30/0631 705/26.7 |
| 8,572,011 B1 * | 10/2013 | Sculley, II | ............. | G06N 20/00 707/723 |

(Continued)

OTHER PUBLICATIONS

Albert Gatt and Emiel Krahmer, Survey of the state of the art in natural language generation: Core tasks, applications and evaluation, Journal of Artificial Intelligence Research, 2018, 61: 65-170.
(Continued)

*Primary Examiner* — Nafiz E Hoque
(74) *Attorney, Agent, or Firm* — Scully, Scott, Murphy & Presser, P.C.

(57) ABSTRACT

A system for assessing text content of a product. The system includes a computing device having a processor and a storage device storing computer executable code. The computer executable code, when executed at the processor, is configured to: provide text contents and confounding features of products; train a first regression model using the text content and the confounding features of the products; train the second regression model using the confounding features; operate the first regression model using the text contents and the confounding features to obtain a total loss; operate the second regression model using the confounding features of to obtain a partial loss; subtract the total loss from the partial loss to obtain a residual loss; use the residual loss to evaluate
(Continued)

models and parameters for the regression models; and use the first regression model to obtain log odds of the words indicating importance of the words.

20 Claims, 6 Drawing Sheets

(51) Int. Cl.
    *G06N 7/00*         (2006.01)
    *G06F 40/289*     (2020.01)
    *G06F 40/30*      (2020.01)
    *G06Q 30/02*      (2012.01)

(52) U.S. Cl.
    CPC ............. *G06F 40/30* (2020.01); *G06N 7/005* (2013.01); *G06Q 30/0201* (2013.01)

(56) References Cited

U.S. PATENT DOCUMENTS

| | | | |
|---|---|---|---|
| 2011/0208511 A1* | 8/2011 | Sikstrom | G06F 16/36 704/9 |
| 2017/0147682 A1 | 5/2017 | Alaqeeli et al. | |
| 2019/0236679 A1* | 8/2019 | Kumar | G06N 3/08 |

OTHER PUBLICATIONS

Satanjeev Banerjee and Alon Lavie, METEOR: An automatic metric for MT evaluation with improved correlation with human judgments, In Proceedings of the acl workshop on intrinsic and extrinsic evaluation measures for machine translation and/or summarization, 2005, 65-72.

Chin-Yew Lin, Rouge: A package for automatic evaluation of summaries, Text Summarization Branches Out, 2004.

Kishore Papineni, Salim Roukos, Todd Ward, and Wei-Jing Zhu, BLEU: a method for automatic evaluation of machine translation, In Proceedings of the 40th annual meeting on association for computational linguistics, Association for Computational Linguistics, 2002, 311-318.

Reid Pryzant, Kelly Shen, Dan Jurafsky, and Stefan Wagner, Deconfounded lexicon induction for interpretable social science, In Proceedings of the 2018 Conference of the North American Chapter of the Association for Computational Linguistics: Human Language Technologies, 2018, V1 (Long Papers): 1615-1625.

Tao Zhang, Jin Zhang, Chengfu Huo, and Weijun Ren, Automatic Generation of Pattern-controlled Product Description in E-commerce, In The World Wide Web Conference, 2019, 2355-2365.

* cited by examiner

SYSTEM AND METHOD FOR QUALITY ASSESSMENT OF PRODUCT DESCRIPTION

CROSS-REFERENCES

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference were individually incorporated by reference.

FIELD

The present disclosure relates generally to the field of text assessment, and more particularly to systems and methods for accurately assessing quality of product description text.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

E-commerce websites show a large number of products for customers to choose from. In order to help the customers to find products they need as quickly as possible, the e-commerce websites provide images of the products and text descriptions of the products. The text descriptions often include title of the product, brand of the product, seller for the product, specification of the products, customer review of the products, and question and answers of the product. In order for the customers to have satisfying online shopping experience, it is crucial to evaluate informativeness and aesthetic nature of the text description of the product, and improve quality of the text description. However, it is challenging to accurately assessing the quality of production description text.

Therefore, an unaddressed need exists in the art to address the aforementioned deficiencies and inadequacies.

SUMMARY

In certain aspects, the present disclosure relates to a system for assessing text content of a product. In certain embodiments, the system includes a computing device, and the computing device includes a processor and a storage device storing computer executable code. The computer executable code, when executed at the processor, is configured to:

provide text contents that describe a plurality of products;

provide confounding features of the products, the confounding features comprising brand, price, customer comments, and shop reputation of the products;

train a first regression model using the text contents and the confounding features to obtain a well-trained first regression model;

train a second regression model using the confounding features to obtain a well-trained second regression model, where structure of the second regression model is the same as the first regression model;

operate the well-trained first regression model using the text contents and the confounding features to obtain a total loss;

operate the well-trained second regression model using the confounding features to obtain a partial loss;

subtract the total loss from the partial loss to obtain a residual loss; and evaluate quality of the first regression model based on the residual loss, where the greater the residual loss, the better the first regression model.

In certain embodiments, the computer executable code is further configured to:

configure the first and second regression models as linear regression models and calculate the residual loss;

configure the first and second regression models as logistic regression models and calculate the residual loss;

define the first and second regression models as the linear regression models when the residual loss corresponding to the linear regression models is greater than the residual loss corresponding to the logistic regression models; and define the first and second regression models as the logistic regression models when the residual loss corresponding to the logistic regression models is greater than the residual loss corresponding to the linear regression models.

In certain embodiments, the text contents comprise a plurality of words, the plurality of words are embedded into at least one vector, the at least one vector is used as input for the first regression model, and the computer executable code is further configured to generate log odds of weights of the at least one vector in the well-trained first regression model, the log odds corresponding to the plurality of words and representing importance of the plurality of words.

In certain embodiments, the computer executable code is further configured to generate a new text content based on the importance of the plurality of words.

In certain embodiments, the plurality of words is a plurality of tag words, and each of the plurality of tag words corresponds to a color, an aesthetic feature, or a fashion feature of the products.

In certain embodiments, the plurality of words is a plurality of description words, and each of the plurality of description words is extracted from text descriptions of the products on a webpage of the products.

In certain embodiments, the computer executable code is further configured to:

convert the text contents into an one-hot vector when the text contents comprise a plurality of tag words;

convert the text contents into a plurality of word vectors when the text contents comprise a plurality of description words; and provide the one-hot vector or the plurality of word vectors to the first regression model.

In certain embodiments, the customer comments comprise a number of total comments and a number of good comments.

In certain embodiments, the confounding features of the product further comprise season that the product is for sell.

In certain embodiments, the computer executable code is configured to use click-through rates (CTRs) of webpages of the products as labels, and the total loss and the partial loss are mean square errors.

In certain embodiments, the computer executable conde is configured to use high click rates and low click rates of webpages of the products as labels, one of the webpages is defined as having the high click rate when a number of clicks of the webpage is greater than a threshold click value, and the total loss and the partial loss are cross entropy.

In certain embodiments, the computer executable code is further configured to retrain the first and second regression models when at least one of the following occurs:

decreases or increases of new data of the system is greater than a predetermined drift threshold;

a predetermined time period is passed; and error of the regression models is greater than a predetermined error threshold.

In certain aspects, the present disclosure relates to a method. In certain embodiments, the method includes:

providing, by a computing device, text contents that describe a plurality of product;

providing, by the computing device, confounding features of the products, the confounding features comprising brand, price, customer comments, and shop reputation of the products;

training, by the computing device, a first regression model using the text contents and the confounding features to obtain a well-trained first regression model;

training, by the computing device, a second regression model using the confounding features to obtain a well-trained second regression model;

operating, by the computing device, the well-trained first regression model using the text contents and the confounding features to obtain a total loss;

operating, by the computing device, the well-trained second regression model using the confounding features to obtain a partial loss;

subtracting, by the computing device, the total loss from the partial loss to obtain a residual loss; and evaluating, by the computing device, quality of the first regression model based on the residual loss, where the greater the residual loss, the better the first regression model.

In certain embodiments, the method further comprises:

configuring the first and second regression models as linear regression models and calculating the residual loss;

configuring the first and second regression models as logistic regression models and calculating the residual loss;

defining the first and second regression models as the linear regression models when the residual loss corresponding to the linear regression models is greater than the residual loss corresponding to the logistic regression models; and defining the first and second regression models as the logistic regression models when the residual loss corresponding to the logistic regression models is greater than the residual loss corresponding to the linear regression models.

In certain embodiments, the text contents comprise a plurality of words, the plurality of words are embedded into at least one vector, the at least one vector is used as input for the first regression model, and the method further includes:

generating log odds of weights of the at least one vector in the well-trained first regression model, the log odds corresponding to the plurality of words and representing importance of the plurality of words.

In certain embodiments, the method further includes: generating a new text content based on the importance of the plurality of words.

In certain embodiments, the text content comprises a plurality of tag words corresponding to a color, an aesthetic feature, or a fashion feature of the product or a plurality of description words extracted from a text description of the product on a webpage of the product.

In certain embodiments, the method further includes:

converting the text contents into an one-hot vector when the text contents comprise the plurality of tag words;

converting the text contents into a plurality of word vectors when the text contents comprise the plurality of description words; and providing the one-hot vector or the plurality of word vectors to the first regression model.

In certain embodiments, the method further includes:

using click-through rates (CTRs) of webpages of the products as labels, and the total loss and the partial loss are mean square errors;

using high click rates and low click rates of webpages of the products as labels, where one of the webpages is defined as having the high click rate when a number of clicks of the webpage is greater than a threshold click value, and the total loss and the partial loss are cross entropy.

In certain aspects, the present disclosure relates to a non-transitory computer readable medium storing computer executable code. In certain embodiments, the computer executable code, when executed at a processor of a computing device, is configured to perform the method described above.

These and other aspects of the present disclosure will become apparent from the following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the detailed description and the accompanying drawings. These accompanying drawings illustrate one or more embodiments of the present disclosure and, together with the written description, serve to explain the principles of the present disclosure. Wherever possible, the same reference numbers are used throughout the drawings to refer to the same or like elements of an embodiment, and wherein.

DETAILED DESCRIPTION

Figure 1:
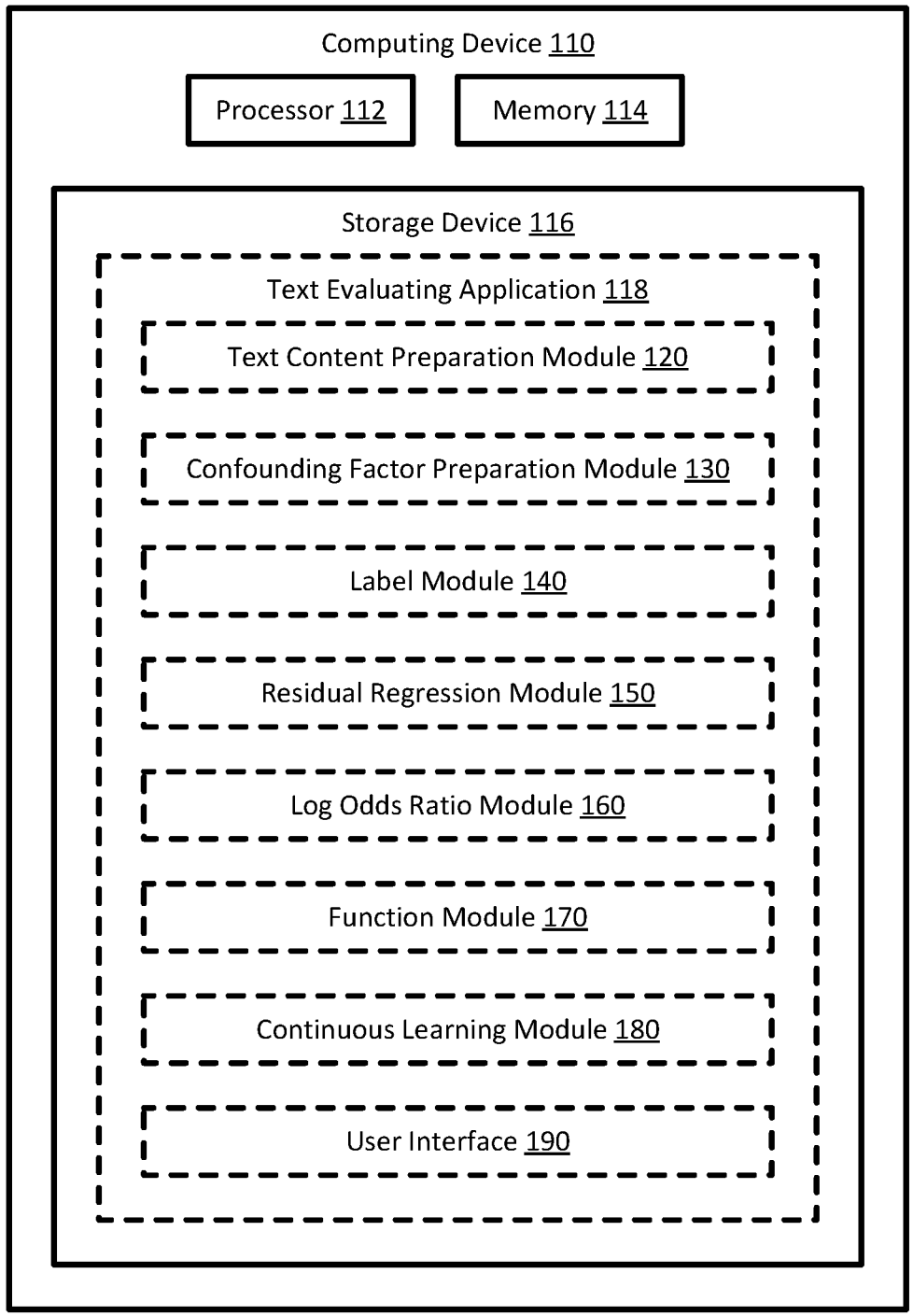
FIG. 1 schematically depicts a system for assessing quality of description text of a product according to certain embodiments of the present disclosure.

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, the terms "comprising," "including," "carrying," "having," "containing," "involving," and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term "module" or "unit" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module or unit may include memory (shared, dedicated, or group) that stores code executed by the processor.

The term "code", as used herein, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The term "interface", as used herein, generally refers to a communication tool or means at a point of interaction between components for performing data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

The present disclosure relates to computer systems. As depicted in the drawings, computer components may include physical hardware components, which are shown as solid line blocks, and virtual software components, which are shown as dashed line blocks. One of ordinary skill in the art would appreciate that, unless otherwise indicated, these computer components may be implemented in, but not limited to, the forms of software, firmware or hardware components, or a combination thereof.

The apparatuses, systems and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The present disclosure will now be described more fully hereinafter with reference to the accompanying drawings, in which embodiments of the present disclosure are shown. This disclosure may, however, be embodied in many different forms and should not be construed as limited to the embodiments set forth herein; rather, these embodiments are provided so that this disclosure will be thorough and complete, and will fully convey the scope of the present disclosure to those skilled in the art.

As described above, product description text is important for customer shopping experience and it is challenging to accurately assessing quality of the description text so as to improve the description text. The challenges at least include (1) confounding factors (or confounding features) and (2) changing aesthetic nature and fashion trend. The confounding factors, such as product price and brand, impact the assessment's accuracy. For examples, words in a description like "luxury" or "bargain" is a confounding factor (price), but it is not informative. Further, as time goes by, aesthetic nature and fashion trend might change. The assess system of production description text should not go "out of style."

Otherwise, it cannot see the change of old word importance, and cannot find new important words in product description text.

In certain aspects, an automatic evaluation is provided for evaluating the quality of product description text. In certain embodiments, the automatic evaluation may be performed using these methods that are widely used in natural language generation tasks, such as machine translation, summarization, etc. In these tasks, the generated texts are easy to evaluate by comparing to the reference ground truth. These methods usually analyzes N-gram overlap between the generated texts and reference. For example, Bilingual Evaluation Understudy (BLEU) analyzes co-occurrences lexical n-grams units between the generated texts and reference, Recall-Oriented Understudy for Gisting Evaluation (ROUGE) measures the description quality by counting the overlapping units (e.g., n-grams) between the generated text and references, and Metric for Evaluation of Translation with Explicit ORdering (METEOR) is calculated as an explicit alignment between the unigrams of the candidate and reference. The disadvantage of these methods is that the reference is not always easy to get. For example, due to the flexibility of natural languages, given an input sentence, a good translation can be various output sentences.

In certain aspects, manual evaluation is provided for evaluating the quality of product description text, where the evaluation is from human judgement. There are several metrics to evaluate the quality of text, e.g., consistency and relevance: the generated texts align with the given input; readability and fluency: grammar correctness and linguistic quality of generated texts; and attractiveness: highly aesthetic sentences. The disadvantage of this method is subjectivity, i.e., the evaluation largely depends on the evaluator's personal judgement.

In certain aspect, task-based evaluation is provided for evaluating the quality of product description text. In certain embodiments, the specific application will define the task-based evaluation metrics, and online A/B test can be employed to evaluate the quality of the texts for the specific task. For example, evaluation metrics can be click-through rate (CTR)—the ratio of users who click on a specific link to the number of total users who view a webpage. It can reflect the informativeness and aesthetic nature of content that a particular website provides to users. The disadvantage is that the evaluation may be confounded by many factors. For example, the impact of product price and brand may override the impact of recommendation texts on CTR.

In summary, the above three types of methods cannot solve the problems in evaluating the quality of product description texts for online retail. The disadvantages include: 1) there exists no ground truth about good recommendation texts vs. bad ones; 2) manual evaluation can be subjective and controversial, depending on personal judgement; and 3) recommendation texts are not the only factor in task-based evaluation, there exists confounding factors like product price and brand that impact the evaluation. More importantly, all the three types of methods cannot fit for dynamics of aesthetic nature and fashion trend as time goes by.

In certain aspects, the present disclosure provides a novel and improved method that (1) can avoid impact of confounding factors by residual regression, and (2) can adapt to change of aesthetic and fashion by continuous learning. In certain embodiments, the disclosure defines task-oriented metrics (e.g., CTR) as labels, and text content and all confounding factors as predictors, and train multiple regression models to single out the importance of text content to the task. In certain embodiments, the disclosure continually feeds in new data from everyday operation at online-retail websites, monitors the data and prediction result, tracks the popularity dynamics of the text, retrains and updates the assessment model, and continually improves accuracy of the assessment system.

FIG. 1 schematically depicts a system for evaluating quality of content according to certain embodiments of the present disclosure. As shown in FIG. 1, the system 100 includes a computing device 110. In certain embodiments, the computing device 110 may be a server computer, a cluster, a cloud computer, a general-purpose computer, a headless computer, or a specialized computer, which evaluates quality of text content. The computing device 110 may include, without being limited to, a processor 112, a memory 114, and a storage device 116. In certain embodiments, the computing device 110 may include other hardware components and software components (not shown) to perform its corresponding tasks. Examples of these hardware and software components may include, but not limited to, other required memory, interfaces, buses, Input/Output (I/O) modules or devices, network interfaces, and peripheral devices.

The processor 112 may be a central processing unit (CPU) which is configured to control operation of the computing device 110. In certain embodiments, the processor 112 can execute an operating system (OS) or other applications of the computing device 110. In certain embodiments, the computing device 110 may have more than one CPU as the processor, such as two CPUs, four CPUs, eight CPUs, or any suitable number of CPUs. The memory 114 may be a volatile memory, such as the random-access memory (RAM), for storing the data and information during the operation of the computing device 110. In certain embodiments, the memory 114 may be a volatile memory array. In certain embodiments, the computing device 110 may run on more than one processor 112 and/or more than one memory 114. The storage device 116 is a non-volatile data storage media or device. Examples of the storage device 116 may include flash memory, memory cards, USB drives, solid state drives, or other types of non-volatile storage devices such as hard drives, floppy disks, optical drives, or any other types of data storage devices. In certain embodiments, the computing device 110 may have more than one storage device 116. In certain embodiments, the computing device 110 may also include a remote storage device 116.

The storage device 116 stores computer executable code. The computer executable code includes a text evaluation application 118. The text evaluation application 118 includes the code or instructions which, when executed at the processor 112, may perform evaluation of text content. In certain embodiments, the text evaluation application 118 may not be executable code, but in a form of circuit corresponding to the function of the executable code. By providing a circuit instead of executable code, the operation speed of the text evaluation application 118 is greatly improved. In certain embodiments, as shown in FIG. 1, the text evaluation application 118 includes, among other things, a text content preparation module 120, a confounding factor preparation module 130, a label module 140, a residual regression module 150, a log odds ratio module 160, a function module 170, a continuous learning module 180, and a user interface 190.

The text content preparation module 120, the confounding factors preparation module 130, and the label module 140 are configured to prepare input from product information, and provide the input to the residual regression module 150. The product may be an item for sell on an e-commerce website, and the product information may be extracted from the web page corresponding to the product, the statistical information of the webpage, and the product database. The product information may include, for example, tags or topics of the product from the text description, words from the text description, and click-through rate (CTR) of the webpage of the product or random forest analysis of the product.

Figure 2:
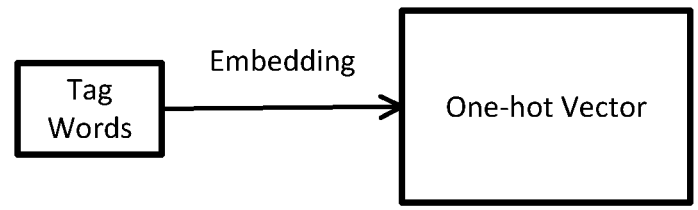
FIG. 2 schematically depicts preparing tag words of a product according to certain embodiments of the present disclosure.

The text content preparation module 120 is configured to convert the text contents of the products to one or more text vectors, and provide the text vectors to the residual regression module 150. In certain embodiments, the text contents are multiple tags or multiple description words. Each of the multiple tags or tag words corresponds to a predefined feature or topic of the product. The tag words are important features of the product that are predefined or learned from the product information. The products provided by the e-commerce website may be categorized, and each category of the products may have corresponding tag words. When the product is in the category of clothing, the tag words may include color of the clothing such as black, white, red, green, blue, and yellow, aesthetic feature of the clothing such as fresh, and clean, fashion feature of the clothing such as classic, casual, office, and spots, material of the clothing such as leather, cotton, and silk. When the products are refrigerators, the tag words may include one door and two door, constant frequency and variable frequency, white, black, and gray, etc. When the product is a keyboard, the tag words may include keyboard, quiet click, and gaming. In certain embodiments, the value of those tag words are extracted from the webpage of the product and optionally from a product database stored in an e-commerce server. For example, the value corresponding to the tag word "black" is 1 for a black shirt, while the value corresponding to the tag words "white," "yellow," or other colors are 0 for the black shirt. In certain embodiments, the number of the tags is about 100-300 for a small category of products. In certain embodiments, as shown in FIG. 2, the text content preparation module 120 is configured to represent the tag words for one product as a one-hot vector, and each dimension of the one-hot vector corresponds to one of the tag words.

Figure 3:
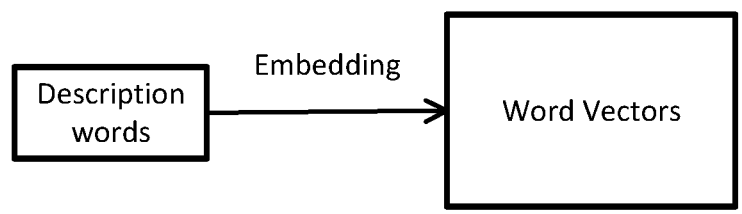
FIG. 3 schematically depicts preparing description words of a product according to certain embodiments of the present disclosure.

In certain embodiments, the text content are the description words extracted from product descriptions from the webpages of the products. In certain embodiments, the description words include every word from the description texts on the product webpages. In certain embodiments, stop words in the product descriptions are removed in advance, where the stop words may include "the," "is," "at," "which," and "on." In certain embodiments, when a word presents in several different places in one of the product descriptions, the word is counted as one description word. In certain embodiments, the number of the description words is large, for example, a few thousands to tens of thousands. In certain embodiments, as shown in FIG. 3, the text content preparation module 120 is configured to convert the description words into word vectors. The conversion may be performed by, for example, word2vec, bidirectional encode representations from transformers (BERT), global vectors (GloVe), or any other word embedding methods.

Figure 4:
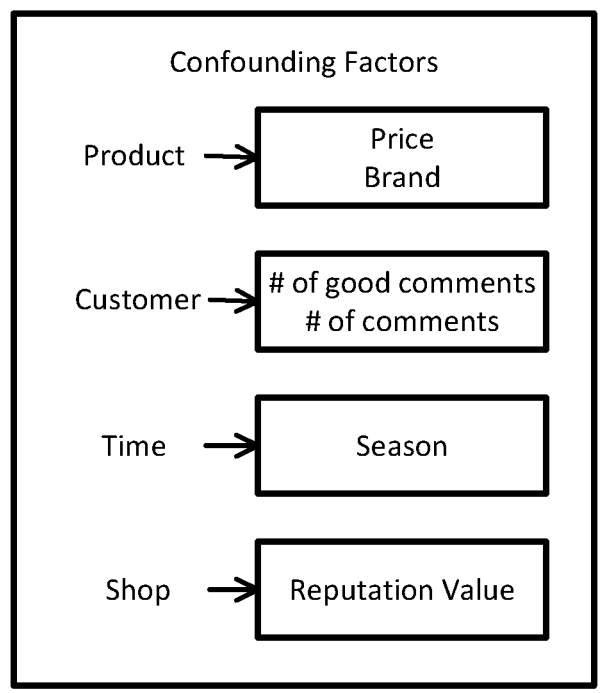
FIG. 4 schematically depicts preparing confounding features of a product according to certain embodiments of the present disclosure.

The confounding factors preparation module 130 is configured to extract confounding factors of the products, convert the confounding factors to confounding vectors and/or confounding values, and provide the confounding vectors or values to the residual regression module 150. In certain embodiments, as shown in FIG. 4, the confounding factors may include price and brand of the product, customer comments or review of the product that include the number of good comments, the number of total comments, and optionally the percentage of good comments, the season of the product such as spring, summer, fall, or winter, and the reputation of the shop or store on the e-commerce website that sells the product. In certain embodiments, the value of the price of the product may be a listed true dollar value of the product, or a number between 0 and 1 representing low and high of the price in the product category; the value of the brand may be a number between 0 and 1 depending on the size of the company holding the brand, the annual sale of the products of the brand, the sales of the products of the brand comparing to sales of the products of other brands in the same category or class; the value of the comments and good comments may be positive integers corresponding to the number of the comments and good comments; the values of the seasons may correspond to total historical sales of the product or of the products in the category in the four seasons; and the value of the reputation may be a integer between 0 and 100 corresponding to the number of reviews of the shop and the number of good reviews of the shop on the e-commerce website. In certain embodiments, different categories of products may have different confounding factors. In certain embodiments, the confounding factors are predefined by the administrator of the system. The confounding factors may be extracted from the webpage of the product and the product database. In certain embodiments, the number of the confounding factors is large. In certain embodiments, the confounding factors are assumed to affect the attractiveness of a version of the product webpage, and the attractiveness of the version of the product webpage may be click-through rate (CTR) of the version of the product webpage in a predetermined time period. In certain embodiments, the confounding factors may be the same or different for different categories of the products, where the categories may include large categories of clothing, consumer electronics, cell phones and accessories, computer and office, toys, sports, home and garden, health, and automotive, and small product categories such as TV, refrigerator, hats, washer. The confounding factors may contribute to CTR more significantly relative to the description words or tags. For example, a CTR of the product webpage may be a high value mainly because the brand of the product is famous, while the description text of the product may only contribute less to the value of the CTR comparing to the brand. In certain embodiments, the confounding factors are defined in advance and a few of them may not contribute to the attractiveness of the product webpage. In certain embodiments, the text evaluating application 118 may be performed to evaluate the importance of the confounding factors, and remove some of the confounding factors that have no or only small effect on the attractiveness of the product webpage. With the confounding factors defined, as shown in FIG. 4, the confounding factor preparation module 130 is configured to convert the confounding factors for the product into values or vectors. For example, the price of the product can be represented by a value of the price. The brands of the products can be a one hot vector, each dimension of the one hot vector corresponding to a brand.

The label module 140 is configured to prepare a label for a training dataset, such as one version of a webpage of a product. When the attractiveness of the product webpage is represented by CTR, the labels of the products is the values of the CTR in the predetermined time period corresponding to a webpage version of the product. In certain embodiments, the attractiveness of the version of the product webpage may also be labeled as the relative clicks of the webpage versions, such as high CTR or low CTR. The high CTR or low CTR may be defined by having a number of clicks quals to or greater than a threshold value, or less than a threshold value. In certain embodiments, when the evaluation criteria is whether a chat board is suitable for machine-human interaction, the label is the number of lines for each chatting instance on the chat board. In certain embodiments, the evaluation may be performed toward a matter other than the product webpage, as long as the matter include text describing the products. The label may be in the form of a value or a vector. Because the labels are objective values from the data, rather than labels defined by users, subjectivity is avoided. After labeling of the product webpages, the label module 140 is configured to provide the labels of the product webpages to the residual regression module 150.

As described above, the text content preparation module 120, the confounding factor preparation module 130 and the label module 140 are configured to prepare the samples or training datasets for the residual regression module 150. For example, there are a lot of products in a product category for training the residual regression module 150, one of the products may have one version or several versions of a product webpage, and each version of the product webpage forms a sample of training data. One sample of training data may include the tag vectors corresponding to tag words or topics of the product, the word vectors corresponding to the words in the product description, the confounding vectors and/or confounding values corresponding to confounding features of the product, and CTR or other labels of the product in the form of a vector or a value.

Figure 5:
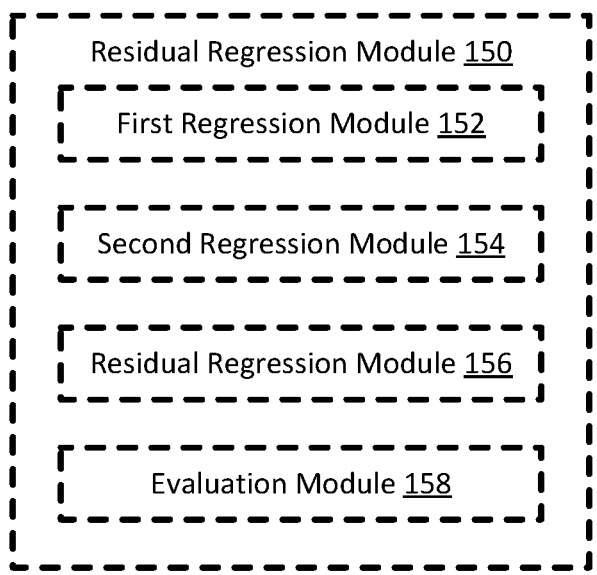
FIG. 5 schematically depicts a residual regression module according to certain embodiments of the present disclosure.

The residual regression module 150 is configured to, upon receiving the training datasets inputted from the text content preparation module 120, the confounding factor preparation module 130 and the label module 140, train the regression modules, evaluate the regression modules, choose the best regression modules based on the evaluation, and make the well-trained regression modules available to the log odds ratio module 170. As shown in FIG. 5, the residual regression module 150 includes a first regression module 152, a second regression module 154, a residual regression module 156, and an evaluation module 158.

The first regression module 152 is configured to, upon receiving the input, train the first regression module 152 using the text vectors, the confounding vectors (and or confounding values), and the corresponding labels of the large number of training datasets, calculate a total loss after training, and send the total loss to the residual regression module 156. Each training dataset may correspond to a product with its features extracted from the product database and a version of text describing the product. One product may correspond to several training datasets, each dataset corresponds to one version of product description. The first regression module 152 may include a binary classification prediction model, a linear regression model, a logistic regression model, a polynomial regression model, a stepwise regression model, a ridge regression model, a lasso regression model, a support vector regression model, an ElasticNet regression model, or any other types of regression models. The text content vectors may be one-hot vectors, or vectors generated by word2vec. The labels of the training datasets may be CTR, high/low CTR, number of chatting lines on a chat board, or high/low chatting lines. The above variations of the first regression module 152 may be defined according to the problem to be solved, i.e., a task, and these different configurations of the first regression module 152 can be evaluated by the evaluation module 158 based on the residual regression calculated by the residual regression module 156. Accordingly, during the training stage, each specific configuration of the first regression module 152 is trained to obtain total losses. Each of the total losses corresponds to one configuration of the first regression module 152. The total loss is defined as $L_{text+confounding\ factors}$ or simply as L. In certain embodiments, the first regression module 152 includes a binary classification prediction model, the labels are high CTR/low CTR, and the loss is a cross entropy loss. In certain embodiments, the first regression module 152 includes a linear regression model, the labels are continuous CTR values, and the loss is mean square error.

The second regression module 154 is configured to, upon receiving the input, train the second regression module 152 using the confounding vectors (and/or confounding values) and the corresponding labels of the large number of training datasets, calculate a partial loss after training, and send the partial loss to the residual regression module 156. The partial loss is named $L_{confounding\ factors}$. For each of the trainings, the configurations of the second regression module 154 is the same as these of the first regression module 152. The only difference is that the input of the second regression module 154 does not include the text vectors.

The residual regression module 156 is configured to, when the total loss L and the partial loss $L_{confounding\ factors}$ corresponding to one configurations of the first and second regression modules 152 are available, calculate the residual loss by subtracting the total loss from the partial loss, and send the residual loss to the evaluation module 158. The residual loss indicates the performance of the first and second regression modules 152 and 154 with the specific configuration (specific model structure and format of the input data), and is defined as:

$$\text{Performance} = L_{confounding\ factors} - L.$$

The evaluation module 158 is configured to, upon receiving the residual losses or Performances corresponding to different configurations of the first and second regression modules 152 and 154, assess the quality of the regression modules based on the value of the Performances, fix the regression module structures for a task based on the assessment result, provide the evaluation result to the log odds ratio module 160, and subject the fixed regression modules 152 ad 154 to the continuous learning module 180. In certain embodiments, the greater value the Performance, the better the regression modules. Because the partial loss represents the effect of the confounding factors upon the quality of the training datasets, the total loss represents the effect of the text contents and the confounding features upon the quality of the training datasets, the difference between the partial loss and the total loss, i.e., the Performance, represents the effect of text contents upon the quality of the training datasets. It is easier and more accurate to evaluate the importance of the text contents when the value of the Performance is greater. Accordingly, the regression module structure and format of the input data corresponding to the highest Performance value are chosen as the best configuration of the regression modules for a specific task.

The log odds ratio module 160 is configure to, upon receiving the evaluation result from the evaluation module 158, make prediction of the log odds ratio of the text vectors, and provide the log odds ratio to the function module 170. Specifically, when the best or the optimized module structure and the format of the input data are determined for the first and second regression modules 152 and 154 by the evaluation module 158, the well-trained first regression modules 152 with corresponding configuration is used for predicting the importance of the text contents. For each text vector in the well-trained first regression module 152, there is a corresponding weight p. The log odds ratio module 160 is configured to calculate the log odds ratio as: log(A)=log [p/(1−p)]. By the conversion, the small value of the weights corresponding to each of the words in the product description is converted into to a large value. The greater the log odds ratio for a text word, the more important the text word in the product descriptions. Because the log odds ratio is larger, the differences among the text words in regard to importance are more obvious, which is useful in other applications of the log odds ratios.

Figure 6:
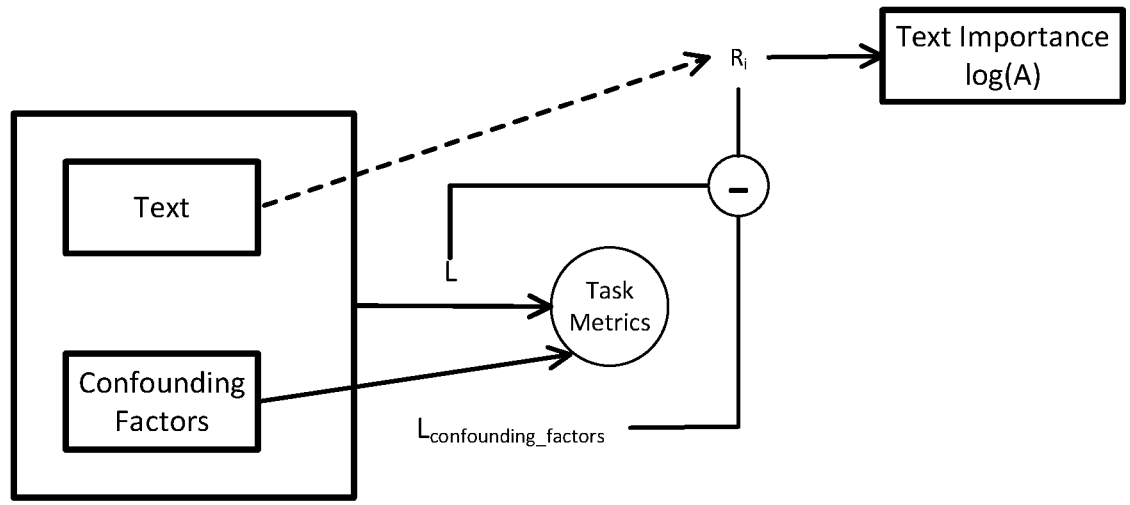
FIG. 6 schematically depicts data flow for residual regression of product features according to certain embodiments of the present disclosure.

Through residual regression analysis, the disclosure can use the best regression modules and choose the best format of the input data for screening text content, where a word with a larger log odds ratio is more important than the other words with a smaller log odds ratios. FIG. 6 schematically depicts the operation of the residual regression according to certain embodiments of the present disclosure. As shown in FIG. 6, one regression is performed using both the text features and confounding features of the products, another regression is performed using only the confounding features, and the difference between the two regressions—the residual regression, corresponds to the contribution of the text toward the target, such as the CTR.

The function module 170 is configured to, when the log odds ratios of the words in the text content are available, perform a function or a task. In certain embodiments, the function module 170 may rank the words from the text content according to their respective log odds ratios, so as to obtain the most important words based on the ranking. As described above, the greater the log odds ratio, the higher the word in the rank. When the text content is a description text, and the function is generating a new description text, the function module 170 is configured to select words that have high rankings, and generate the new description text using the selected high ranking words. Each high ranking words may correspond to a sentence in the generated new product description. When the text content is tag words or topics, and the function is generating a new text, the function module 170 is configured to select tag words that have high rankings, and generate several paragraphs. Each generated new paragraph may correspond to one of the chosen tag words.

Referring back to FIG. 1, the continuous learning module 180 is configured to trigger retraining of the residue regression module 150, specifically the first and second regression modules 152 and 154 according to certain criteria. In certain embodiments, since the regression model structures and the input formats have already been defined by the evaluation module 158 for a specific task, there may be no need to calculate residual regression and make the evaluation again. In certain embodiments, the update may also be performed on the first regression module 152 only, which will then be used to calculate log odds ratios of the text words. In other embodiments, since the datasets may have changed dramatically, the text evaluation application 118 may also repeat the process of calculating residual regression and evaluating the different structured regression models to see whether the current regression models and input parameters are still better than the other types of regression models and input parameters.

Figure 7:
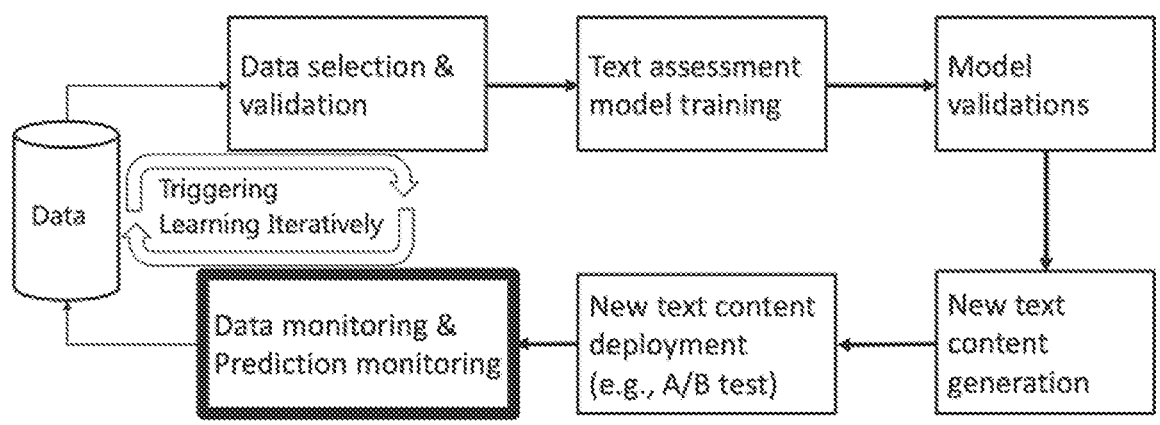
FIG. 7 schematically depicts data flow of continuous learning of product description text according to certain embodiments of the present disclosure.

As time goes by, aesthetic nature and fashion trend might change for online retail. For example, some old important words become less popular, some new popular words follow into the spotlight. Thus, an assess system of production description text should consider the dynamics to guarantee its assessment accuracy. The text assessment systems in the art becomes powerless for change of old word importance and new popular words. The fundamental reason is that data is not static, it evolves. As a result, verification of the text assessment systems performed during deployment becomes invalid through the passage of time. In order to address this challenge, certain embodiments of the present disclosure provide the continuous learning model 180 to continuously update the deployed models. FIG. 7 schematically depicts a pipeline of assessment model evolution performed by the continuous learning model 180. One key question in the pipeline is when to trigger new round of learning. Two types of monitoring can serve as the trigger. Data monitoring can analyze the incoming data looking for possible anomalies, drift, and change-points, and prediction monitoring can analyze the prediction bias, e.g., the assessment accuracy error. In certain embodiments, the continuous learning model 180 is configured to trigger a new round of training using at least one of the following triggering strategies.

Strategy 1: the continuous learning model 180 monitors increase/decrease rate of new data during a specific time window, e.g., hour or minute. Once the continuous learning model 10 captures the burst, anomalies, drift or change-points, the continuous learning model 180 chooses the data during the burst as the sampling data for retraining the first regression module 152 and optionally the second regression module 154. There are many types of drift detection methods, such as the ones cited in Joaquin Quinonero-Candela et al., Data Shift in Machine Learning, the MIT Press, 2009, which are incorporated herein by reference in its entirety. After the burst passed, the continuous learning model 180 triggers the learning process by the residual regression module 150, and learns new important text content during the burst period. The benefit of this strategy is that it can track the text importance and find the new popular text during burst period.

Strategy 2: the continuous learning model 180 can monitor new data by using the fixed period length as the sampling period, e.g., year, season, month etc. The continuous learning model 180 triggers the learning process periodically. The benefit of this strategy is that it can track the change of text importance and find the aligned popular text content during different period, e.g., different season.

Strategy 3: the continuous learning model 180 can monitor prediction errors. Once the error rate is bigger than a predefined threshold, it triggers the learning process. The benefit of this strategy is that it can track the change of old word importance and find new important words.

The user interface 190 is configured to provide a user interface or graphic user interface in the computing device 110. In certain embodiments, the user or the administrator of the system is able to configure parameters for the computing device 110, especially the parameters used in the text evaluating application 118 using the interface 180. The parameters may include the choose of the regression model for the first and second regression modules 152 and 154, the methods of generating vectors (and/or values) from the text content and the confounding factors, the method of labeling the training datasets.

Figure 8:
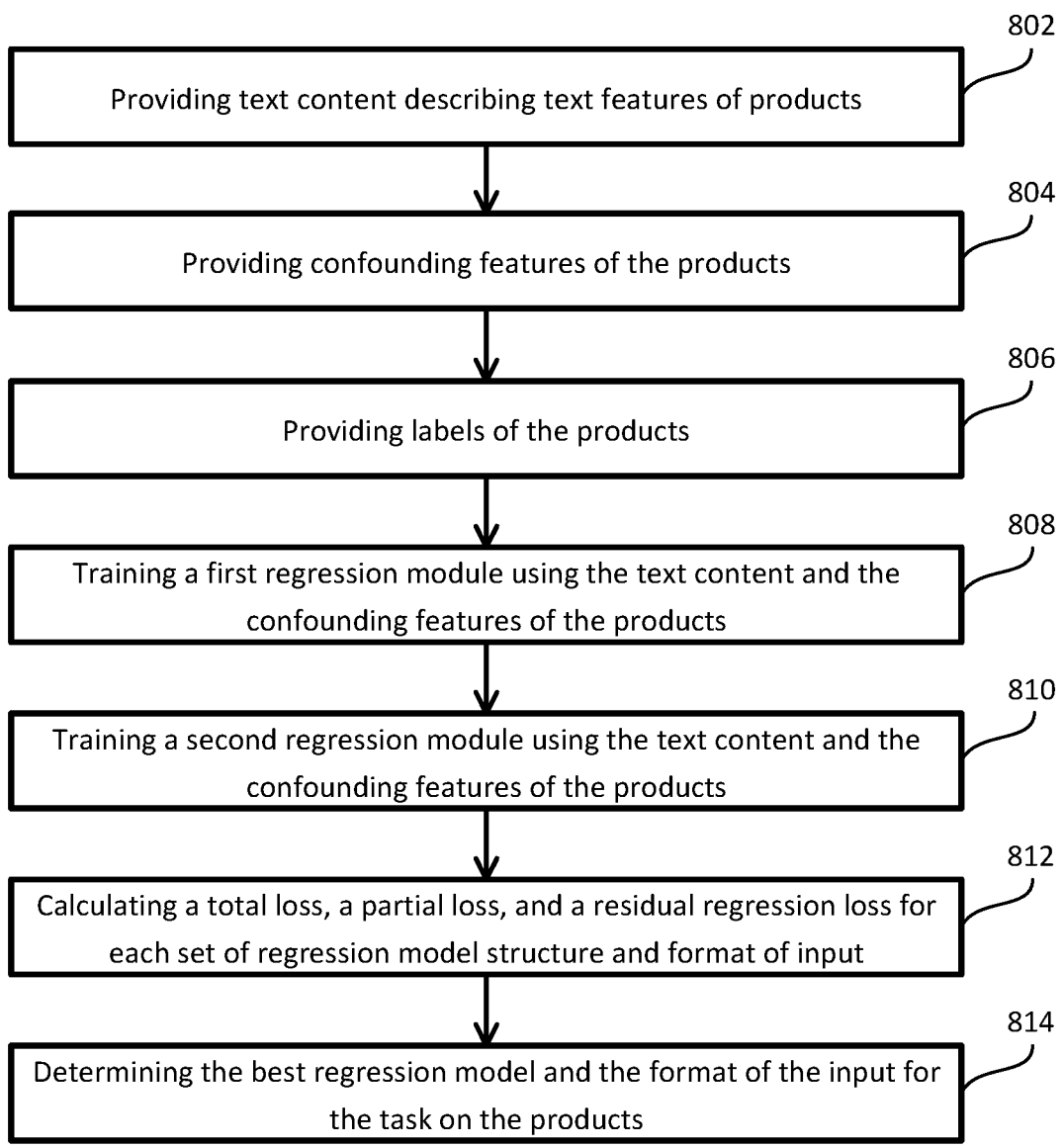
FIG. 8 schematically depicts a method for assessing quality of regression modules according to certain embodiments of the present disclosure.

FIG. 8 schematically depicts a method for training and evaluating the quality of regression models according to certain embodiments of the present disclosure. In certain embodiments, the method 800 as shown in FIG. 8 may be implemented on a computing device 110 as shown in FIG. 1. It should be particularly noted that, unless otherwise stated in the present disclosure, the steps of the method may be arranged in a different sequential order, and are thus not limited to the sequential order as shown in FIG. 8.

At procedure 802, the text content preparation module 120 converts the text content to one or more text vectors and sends the text vectors to the residual regression module 150. In certain embodiments, the text content includes predefined tag words or topics, the text vector is a one-hot vector, and each dimension of the one-hot vector corresponds to one of the tag words. In certain embodiments, the text content includes a large number of description words extracted from product descriptions. The product descriptions may be the text show on the webpages of the products. In certain embodiments, the extraction of the description words include removing stop words from the product description, and the repeating description words are defined as one description word. The extracted description words are converted to word vectors by, for example word2vec. Each word vector corresponds to one of the description words.

At procedure 804, the confounding factor preparation module 130 converts confounding factors of the products to confounding vectors, and sends the confounding vectors to the residual regression module 150. The confounding factors may include the price, brand of the products, the number of total customer comments and the number of good customer comments of the products, the reputation of the shop selling the product. Each confounding vector may correspond to one of the confounding factors.

At procedure 806, the label module 140 provides the labels of the products to the residual regression module 150. The labels may be defined by an administrator or a user of the system, and extracted automatically by the label module 140 from the information of the training datasets. In certain embodiments, the labels may also be learned by a machine learning model. In certain embodiments, the procedures 802, 804, and 806 are coordinated and combined together, and the combined input are sent to the residual regression module 150. The combined input thus includes a large number of training datasets, each dataset include the text vectors (the description word vectors or the tag word vectors), the confounding vectors, and the labels.

At procedure 808, upon receiving the text vectors, the confounding vectors, and the labels of the products, the residual regression module 150 trains the first regression module 152 using the text vectors, the confounding vectors, and the labels. There are different configurations for the structure of the first regression module 152 and the format of the input for a task, and the training is performed for each configuration using the training datasets.

At procedure 810, upon receiving the text vectors, the confounding vectors, and the labels of the products, the residual regression module 150 trains the second regression module 154 using the confounding vectors and the labels, but not the text vectors. The structure of the second regression module 154 is the same as the structure of the first regression module 152, and the format of the confounding vectors and the labels correspond to the format used by the first regression module 152, so as to make efficient comparison.

At procedure 812, when the first regression module 152 and the second regression module 154 are well-trained for the task using one type of configuration, the evaluation module 158 calculates a total loss from the first regression module 152, calculates a partial loss from the second regression module 154, and calculates a residual regression loss by subtracting the total loss from the partial loss. The residual regression losses are also named the Performances of the configurations.

At procedure 814, by repeating the procedure 812 for each of the regression module configurations, a set of residual regressions losses are available. The regression module configuration having the largest residual regression loss is determined to be the best configuration for making predictions for the task.

Figure 9:
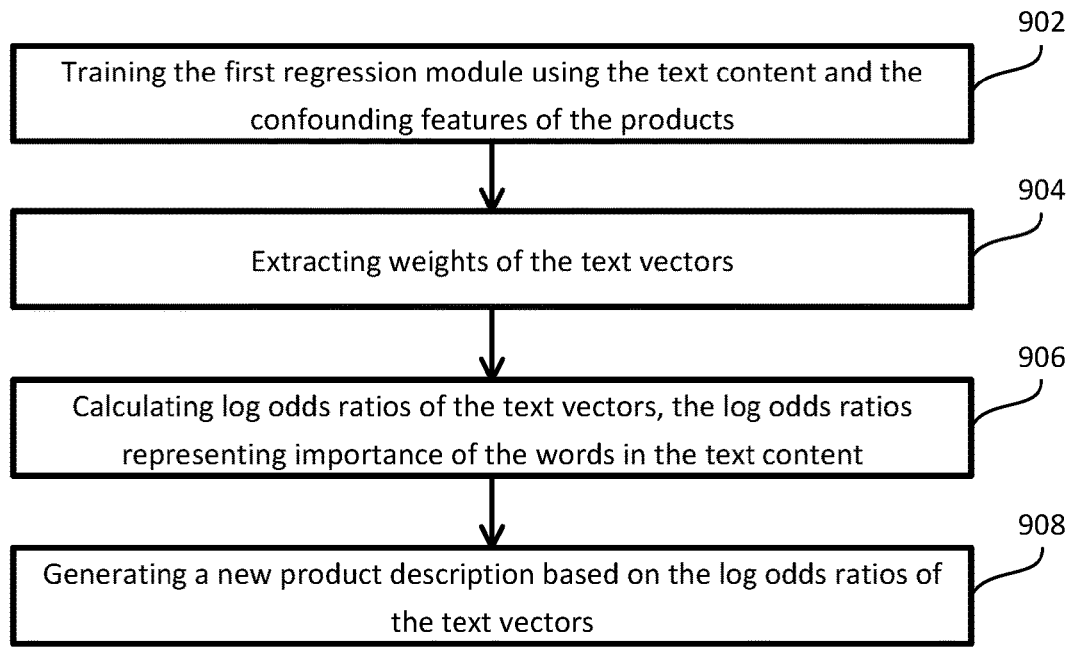
FIG. 9 schematically depicts a method for using high quality words from text content according to certain embodiments of the present disclosure.

FIG. 9 schematically depicts a method for predicting importance of text content according to certain embodiments of the present disclosure. In certain embodiments, the method 900 as shown in FIG. 9 may be implemented on a computing device 110 as shown in FIG. 1. It should be particularly noted that, unless otherwise stated in the present disclosure, the steps of the method may be arranged in a different sequential order, and are thus not limited to the sequential order as shown in FIG. 9.

When the best configuration of the regression module structure and the format of inputs are determined at procedure 814 above, the first regression model 152 may then be used to make predictions using the configuration. Accordingly, at procedure 902, the residual regression module 150 trains the first regression module 152 with the best configuration using the text vectors, the confounding vectors (and/or values), and the labels. In certain embodiments, the procedure 902 may not be necessary if the training of the first regression model 152 has already been performed at the procedure 808 described above using the best configuration.

At procedure 904, when the first regression module 152 is well-trained, the log odds ratio module 160 extracts weights of the text vectors from the well-trained first regression module 152. Each text vector corresponds to one tag word or one description word.

At procedure 906, after extracting the weights, the log odds ratio module 160 calculates a log odd ratio for each of the weights, ranking the corresponding words from the text content according to their respective log odd ratios, and sends the log odd ratios to the function module 170. Each calculated log odd ratio indicates the importance of a corresponding word in the text content. The greater the log odd ratio, the more importance the word in the description of the product.

At procedure 908, upon receiving the ranked words and basic information of a product, the function module 170 performs a new task, such as generates a new text description for the product. For example, when the text content is tag words, the function module 170 chooses a number of high ranking tag words that are related to the basic information of the product. The number may be 5-10. Each of the tag words is used as the topic of a paragraph. The function module 170 then generates 5-10 paragraphs as the description of the product.

In another example, when the text content is description words, the function module 170 chooses a number of high ranking description words that are related to the basic information of the product. The number may be 3-7. Each of the description words is used as the topic of a sentence. The function module 170 then generates 3-7 sentences, and combines the 3-7 sentences as a paragraph of the new product description.

In certain embodiments, the above generating of sentences and paragraphs of a product description may have different variations. For example, the generation may also consider the style of the generated product description, the audience of the generated product description, and the important features of the product.

Figure 10:
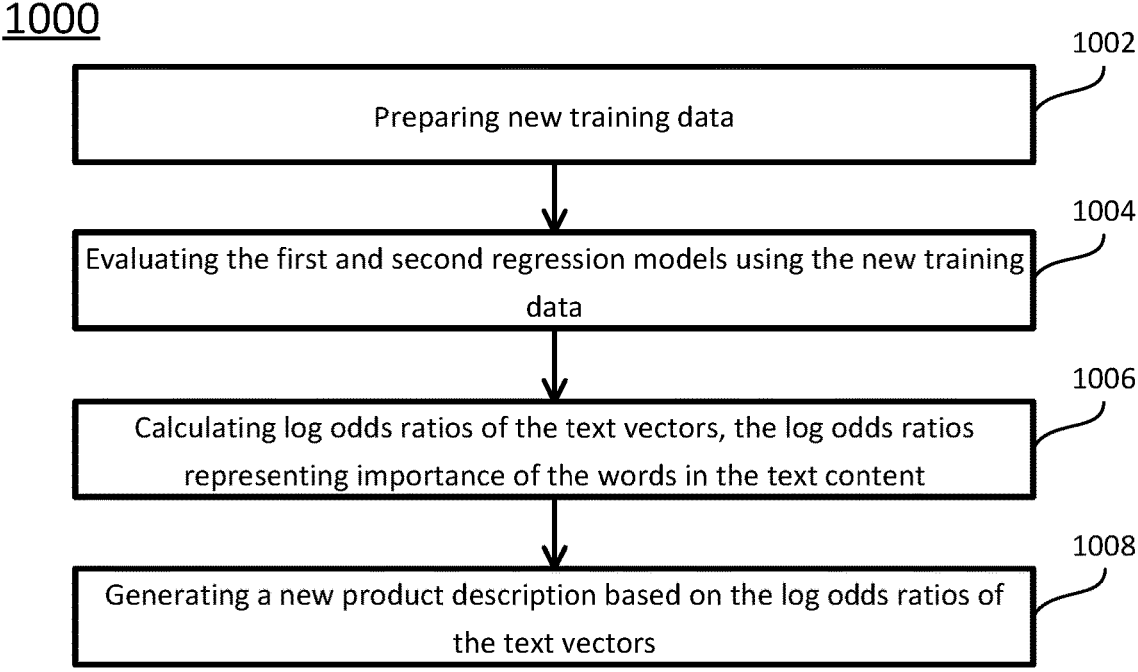
FIG. 10 schematically depicts a method for continuous updating of residual modules according to certain embodiments of the present disclosure.

In certain embodiments, the present disclosure relates to a method for retraining the residual regression module 150. In certain embodiments, the retraining of the residual regression module 150 is triggered by the continuous learning module 180. The trigger of the retaining may include at least one of the three different routes. FIG. 10 schematically depicts a method for continuous learning of the text evaluation application 118 according to certain embodiments of the present disclosure. In certain embodiments, the method 1000 as shown in FIG. 10 may be implemented on a computing device 110 as shown in FIG. 1. It should be particularly noted that, unless otherwise stated in the present disclosure, the steps of the method may be arranged in a different sequential order, and are thus not limited to the sequential order as shown in FIG. 10.

When the product description data are updated, at procedure 1002, the continuous learning module 180 instructs data selection and validation, and requests the text content preparation module 120, the confounding factor preparation module 130 and the label module 140 to prepare training samples for the residual regression module 150.

At procedure 1004, the residual regression module 150 trains the first and second regression modules, calculates residual regressions, and validates whether the first and second regression modules are still good based on the residual regressions.

At procedure 1006, after validating the first and second regression modules, log odds ratio module 160 uses the first regression modules to calculate log odds ratios of the new text words, and generates a new product description based on the log odds ratios, where the words having greater log odds ratios are preferred in the generation of the product description.

At procedure 1008, the text evaluating application 118 deploys the new product description, and compare whether the new product description is better than the previous product description. The text evaluating application 118 then keeps the new product description if it is better than the previous product description, for example, if the new product description induces more clicks than that of the previous product description.

During and after this time, the continuous learning module 180 monitors data and the predictions made by the first regression module 152, and triggers the learning process from the procedure 1002 to the procedure 1008. The system may trigger the above process when conditions of at least one of the above described three strategies are satisfied.

In certain embodiments, after triggering of the iterative learning, the learning may not only be used to optimize the parameters of the regression model and the parameters of the input. Instead, the learning may determine which combination of the regression model and the input format preparation is best suited for the updated datasets. For example, the text input may be represented by a vector of word frequencies or a sequence of word embeddings. The combinations of different models and input formats can then be compared based on the Performances by residual regression, and the combination with the best Performance is then used to analyze the new datasets and mine new trend words from the new datasets. In certain embodiments, the process of determining the best combinations may be performed using the process the same as or similar to the method 800.

In a further aspect, the present disclosure is related to a non-transitory computer readable medium storing computer executable code. The code, when executed at a processor 112 of the computing device 110, may perform the methods as described above. In certain embodiments, the non-transitory computer readable medium may include, but not limited to, any physical or virtual storage media. In certain embodiments, the non-transitory computer readable medium may be implemented as the storage device 116 of the computing device 110 as shown in FIG. 1.

In summary, certain embodiments of the present disclosure, among other things, have the following advantages. (1) The disclosed method uses residualizing regression analysis to exclude confounding factors, so as to focus on quality of text content (its impact to the particular task). The method improves the accuracy of text assessment system by getting rid of confounding factors (e.g., price and brand). By this method, the best regression model and the best format of the inputs are determined easily. (2) The disclosure applies a continuous learning framework to continually improve the accuracy of the assessment system which is suitable for content change as time goes by. As a result, it can track and update the change of word importance, and even find new important words through the assessment system. (3) Because the disclosure uses task-based metrics as the label, there is no human label (subjectivity is avoided, conquer the limitation of manual evaluation), or reference content (flexibility is allowed, conquer the limitation of automatic evaluation).

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A system comprising a computing device, wherein the computing device comprises a processor and a storage device storing computer executable code, and the computer executable code, when executed at the processor, is configured to:
provide text contents that describe a plurality of products;
provide confounding features of the products, the confounding features comprising brand, price, customer comments, and shop reputation of the products;
train a first regression model using the text contents and the confounding features to obtain a well-trained first regression model;
train a second regression model using the confounding features to obtain a well-trained second regression model, wherein structure of the second regression model is the same as the first regression model;
operate the well-trained first regression model using the text contents and the confounding features to obtain a total loss;
operate the well-trained second regression model using the confounding features to obtain a partial loss;
subtract the total loss from the partial loss to obtain a residual loss;
evaluate quality of the first regression model based on the residual loss, wherein the greater the residual loss, the better the first regression model; and
monitor decreases or increases of new data of the system, and retrain the first and second regression models by using the new data when the decreases or increases of the new data of the system are greater than a predetermined drift threshold.

2. The system of claim 1, wherein the computer executable code is further configured to:
   configure the first and second regression models as linear regression models and calculate the residual loss;
   configure the first and second regression models as logistic regression models and calculate the residual loss;
   define the first and second regression models as the linear regression models when the residual loss corresponding to the linear regression models is greater than the residual loss corresponding to the logistic regression models; and
   define the first and second regression models as the logistic regression models when the residual loss corresponding to the logistic regression models is greater than the residual loss corresponding to the linear regression models.

3. The system of claim 1, wherein the text contents comprise a plurality of words, the plurality of words are embedded into at least one vector, the at least one vector is used as input for the first regression model, and the computer executable code is further configured to generate log odds of weights of the at least one vector in the well-trained first regression model, the log odds corresponding to the plurality of words and representing importance of the plurality of words.

4. The system of claim 3, wherein the computer executable code is further configured to generate a new text content based on the importance of the plurality of words.

5. The system of claim 3, wherein the plurality of words is a plurality of tag words, and each of the plurality of tag words corresponds to a color, an aesthetic feature, or a fashion feature of the products.

6. The system of claim 3, wherein the plurality of words is a plurality of description words, and each of the plurality of description words is extracted from text descriptions of the products on a webpage of the products.

7. The system of claim 1, wherein the computer executable code is further configured to:
   convert the text contents into an one-hot vector when the text contents comprise a plurality of tag words;
   convert the text contents into a plurality of word vectors when the text contents comprise a plurality of description words; and
   provide the one-hot vector or the plurality of word vectors to the first regression model.

8. The system of claim 1, wherein the customer comments comprise a number of total comments and a number of good comments.

9. The system of claim 1, wherein the confounding features of the product further comprise season that the product is for sell.

10. The system of claim 1, wherein the computer executable code is configured to use click-through rates (CTRs) of webpages of the products as labels, and the total loss and the partial loss are mean square errors.

11. The system of claim 1, wherein the computer executable conde code is configured to use high click rates and low click rates of webpages of the products as labels, one of the webpages is defined as having the high click rate when a number of clicks of the webpage is greater than a threshold click value, and the total loss and the partial loss are cross entropy.

12. The system of claim 1, wherein the computer executable code is further configured to retrain the first and second regression models when at least one of the following occurs:
   a predetermined time period is passed; and
   error of the regression models is greater than a predetermined error threshold.

13. A method, comprising:
   providing, by a computing device, text contents that describe a plurality of products;
   providing, by the computing device, confounding features of the products, the confounding features comprising brand, price, customer comments, and shop reputation of the products;
   training, by the computing device, a first regression model using the text contents and the confounding features to obtain a well-trained first regression model;
   training, by the computing device, a second regression model using the confounding features to obtain a well-trained second regression model;
   operating, by the computing device, the well-trained first regression model using the text contents and the confounding features to obtain a total loss;
   operating, by the computing device, the well-trained second regression model using the confounding features to obtain a partial loss;
   subtracting, by the computing device, the total loss from the partial loss to obtain a residual loss;
   evaluating, by the computing device, quality of the first regression model based on the residual loss, wherein the greater the residual loss, the better the first regression model; and
   monitoring decreases or increases of new data of the system, and retraining the first and second regression models by using the new data when the decreases or increases of the new data of the system are greater than a predetermined drift threshold.

14. The method of claim 13, further comprising:
   configuring the first and second regression models as linear regression models and calculating the residual loss;
   configuring the first and second regression models as logistic regression models and calculating the residual loss;
   defining the first and second regression models as the linear regression models when the residual loss corresponding to the linear regression models is greater than the residual loss corresponding to the logistic regression models; and
   defining the first and second regression models as the logistic regression models when the residual loss corresponding to the logistic regression models is greater than the residual loss corresponding to the linear regression models.

15. The method of claim 13, wherein the text contents comprise a plurality of words, the plurality of words are embedded into at least one vector, the at least one vector is used as input for the first regression model, and the method further comprising:
   generating log odds of weights of the at least one vector in the well-trained first regression model, the log odds corresponding to the plurality of words and representing importance of the plurality of words.

16. The method of claim 15, further comprising: generating a new text content based on the importance of the plurality of words.

17. The method of claim 15, wherein the text content comprises a plurality of tag words corresponding to a color, an aesthetic feature, or a fashion feature of the product or a plurality of description words extracted from a text description of the product on a webpage of the product.

18. The method of claim 17, further comprising:
converting the text contents into an one-hot vector when the text contents comprise the plurality of tag words;
converting the text contents into a plurality of word vectors when the text contents comprise the plurality of description words; and
providing the one-hot vector or the plurality of word vectors to the first regression model.

19. The method of claim 13, further comprising:
using click-through rates (CTRs) of webpages of the products as labels, and the total loss and the partial loss are mean square errors; and
using high click rates and low click rates of webpages of the products as labels, wherein one of the webpages is defined as having the high click rate when a number of clicks of the webpage is greater than a threshold click value, and the total loss and the partial loss are cross entropy.

20. A non-transitory computer readable medium storing computer executable code, wherein the computer executable code, when executed at a processor of a computing device, is configured to:
provide text contents that describe a plurality of products;
provide confounding features of the products, the confounding features comprising brand, price, customer comments, and shop reputation of the products;
train a first regression model using the text contents and the confounding features to obtain a well-trained first regression model;
train a second regression model using the confounding features to obtain a well-trained second regression model, wherein structure of the second regression model is the same as the first regression model;
operate the well-trained first regression model using the text contents and the confounding features to obtain a total loss;
operate the well-trained second regression model using the confounding features to obtain a partial loss;
subtract the total loss from the partial loss to obtain a residual loss;
evaluate quality of the first regression model based on the residual loss, wherein the greater the residual loss, the better the first regression model; and
monitor decreases or increases of new data of the system, and retrain the first and second regression models by using the new data when the decreases or increases of the new data of the system are greater than a predetermined drift threshold.

* * * * *